March 30, 1965 R. J. ILFIELD 3,175,364
HYDRAULIC TRANSMISSION SYSTEMS
Filed May 23, 1963
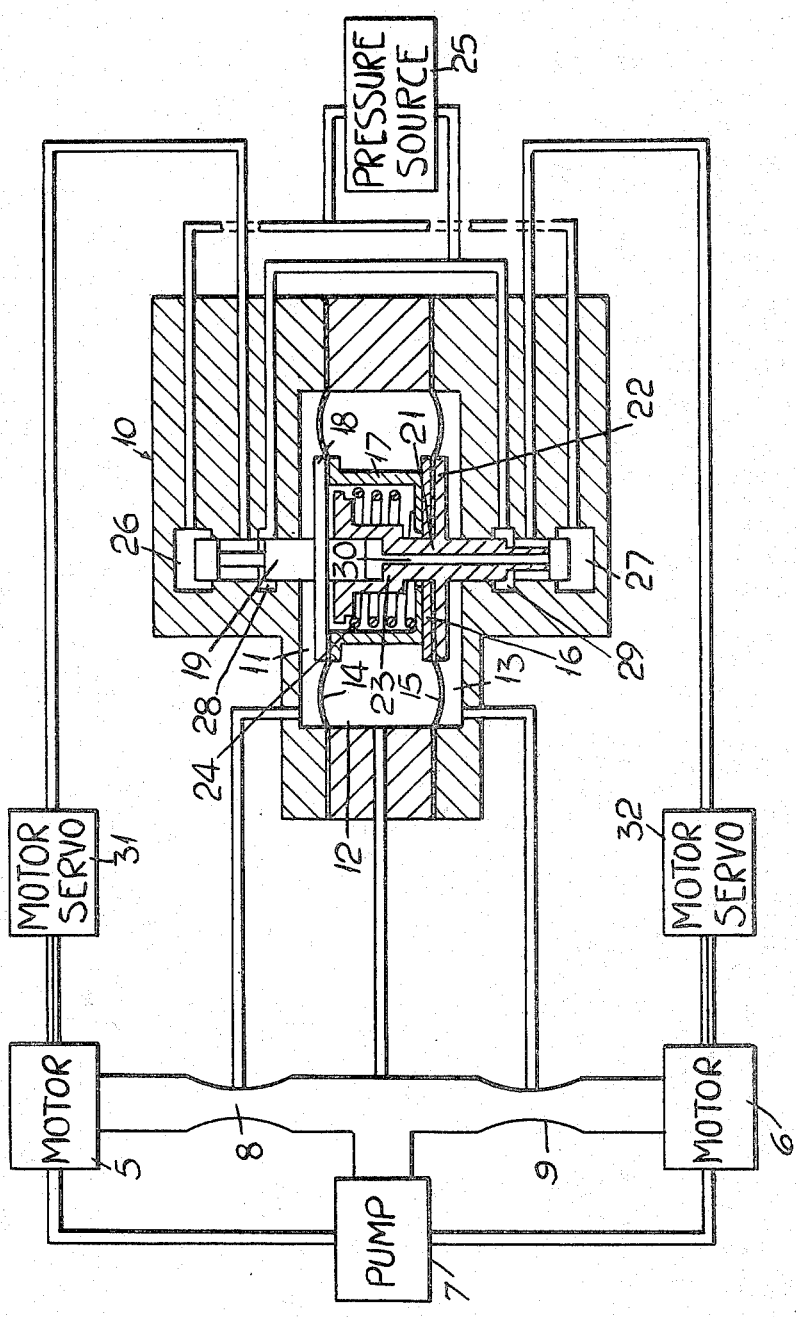

United States Patent Office 3,175,364
Patented Mar. 30, 1965

3,175,364
HYDRAULIC TRANSMISSION SYSTEMS
Richard Joseph Ilfield, Birmingham, England, assignor to Joseph Lucas (Industries) Limited, Birmingham, England
Filed May 23, 1963, Ser. No. 282,803
Claims priority, application Great Britain, May 31, 1962, 20,892/62
1 Claim. (Cl. 60—53)

This invention relates to hydraulic transmission systems for road vehicles, of the kind including a pair of variable stroke hydraulic motors for driving wheels of the road vehicle respectively, and an engine-driven pump for supplying hydraulic fluid to the motors.

According to the invention, a transmission system of the kind specified includes a pair of restrictions in the flow lines between the outlets from the motors and the pump, axially movable valve means normally held in an equilibrium position by the equal pressures at said restrictions, but movable in opposite axial directions upon reduction of the pressures at said restrictions respectively, and means operable upon axial movement of the valve means, when the pressure at one restriction falls due to the wheel driven by one motor starting to spin, for decreasing the stroke of said one motor until the pressures at said restrictions are equal.

An example of the invention is illustrated diagrammatically in the accompanying drawing.

Referring to the drawing there are provided first and second variable stroke hydraulic motors 5, 6 preferably of the swash plate type, which are supplied with hydraulic fluid by a single pump 7. Moreover, in the flow lines between the outlets from the motors and the pump are formed first and second restrictions 8, 9 respectively.

There is further provided a body 10 in which is formed a chamber divided into first, second and third chambers 11, 12, 13 by means including a pair of diaphragms 14, 15. The outer chambers 11, 13 are connected to the restrictions 8, 9 respectively, whilst the chamber 12 is connected to the flow line at a position downstream of the restrictions.

Situated between the chambers 12, 13 is a plate 16, which is fixed to the chamber side wall whilst within the chamber 12 is a cup-shaped member 17 bearing against the plate 16. The cup-shaped member is connected through a cross-member 18 in the chamber 11 to a spool valve 19 extending from the chamber 11 into the body, and the diaphragm 14 is clamped between the members 17, 18. Further, extending from the chamber 13 into the body is a second spool valve 21, the spool of which has a flange 22 bearing against the plate 16 and an extension 23 which extends through the plate 16 into the chamber 12. A coiled compression spring 24 acts between the extension 23 and the member 17 and moreover the spool of the valve 19 has an end portion sliding within a bore in the extension 23 in the manner of a piston. The diaphragm 15 is secured to the flange 22.

There is further provided a pressure source 25 conveniently derived from the pump 7. The source 25 provides high pressure to galleries 26, 27 and low pressure to galleries 28, 29 in the body 10. The gallery 27 is at all times in communications with a bore 30 in the valve 21, and it will be seen that this arrangement ensures that the high pressure acts in opposite directions on the spool of both valves 19, 21. Galleries 26, 28 are alternatively connectible under the control of the valve 19 to a servo-mechanism 31 for determining the stroke of the motor 5. Similarly, the valve 21 controls flow from the galleries 27, 29 to a servo-mechanism 32 for determining the stroke of the motor 6. The arrangement is such that decrease or increase in the pressure supplied to the mechanisms 31, 32 results in increase or decrease respectively of the strokes of the motors 5, 6.

The servo-mechanisms may take a variety of forms. However, in one example the servo-mechanism comprises a piston connected to the swash plate of the pump to determine its angularity, the position of the piston being controlled by the pressure applied to it under the control of either the valve 19 or the valve 21.

Normally, the mechanisms 31, 32 are connected to the low pressure source. However, if the wheel driven by the motor 5, for example, starts to spin, the pressure in the flow line from the motor 5 to the pump 7 falls with increasing motor speed but no change in the rate of delivery of fluid from the pump. Thus the pressure at the restriction 8 falls with a corresponding fall in the pressure in the chamber 11 and the member 17 moves against the spring 24 due to the pressure difference in the chambers 11 and 12 to move the valve 19 to a position to subject the mechanism 31 to the high pressure and thereby decrease the stroke of the motor 5 until the pressures in the restrictions 8, 9 are equalized. When movement of the member 17 takes place, however, the plate 16 prevents corresponding movement of the spool of the valve 21. If the wheel driven by the motor 6 starts to spin, the operation is similar except that the spool of the valve 21 is moved.

Having thus described my invention, what I claim as new and desire to secure by Letters Patent is:

An hydraulic transmission system for a road vehicle comprising a pair of wheel driving motors, an engine driven pump, flow lines connecting the pump with the motors respectively, a pair of fluid pressure operable servo mechanisms, motor stroke varying means operatively connected to the servo mechanisms, restricting means in the flow lines between the motor outlets and the pump respectively, a pressure source in the system, flow lines connecting the pressure source with the servo mechanisms, a body defining an interior chamber, flow lines connecting separate portions of the chamber with the restricting means respectively, a pair of deformable diaphragms arranged within the interior chamber of the body serving respectively as boundary walls of said separate portions of the chamber, and a pair of valve members disposed within the body and connected for movement in unison with diaphragm movements, said valve members being disposed in the flow lines between the pressure source and the servo mechanisms respectively.

References Cited by the Examiner
UNITED STATES PATENTS 2,215,169   9/40   Beeston _____ 60—97
2,859,591   11/58  Zimmerman _____ 60—97
3,114,424   12/63  Voreaux et al. _____ 60—53 X JULIUS E. WEST, *Primary Examiner.*
EDGAR W. GEOGHEGAN, *Examiner.*